US009484592B2

(12) United States Patent
Roh et al.

(10) Patent No.: US 9,484,592 B2
(45) Date of Patent: Nov. 1, 2016

(54) BATTERY MODULE HAVING STRUCTURE OF IMPROVED STABILITY AND HIGH COOLING EFFICIENCY

(71) Applicant: LG CHEM, LTD., Seoul (KR)

(72) Inventors: Tae Hwan Roh, Daejeon (KR); Jong Woon Choi, Daejeon (KR); Jung Oh Moon, Daejeon (KR); Jun Hee Jung, Daejeon (KR); Sooryoung Kim, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 238 days.

(21) Appl. No.: 14/535,509

(22) Filed: Nov. 7, 2014

(65) Prior Publication Data

US 2015/0064540 A1 Mar. 5, 2015

Related U.S. Application Data

(63) Continuation of application No. PCT/KR2013/004979, filed on Jun. 5, 2013.

(30) Foreign Application Priority Data

Jun. 7, 2012 (KR) .................... 10-2012-0060757

(51) Int. Cl.
*H01M 10/04* (2006.01)
*B60L 11/18* (2006.01)
*H01M 2/10* (2006.01)
*H01M 2/20* (2006.01)
*H01M 10/647* (2014.01)
*H01M 10/6554* (2014.01)
*H01M 10/613* (2014.01)
*H01M 2/30* (2006.01)

(52) U.S. Cl.
CPC ...... *H01M 10/0413* (2013.01); *B60L 11/1874* (2013.01); *H01M 2/1077* (2013.01);
(Continued)

(58) Field of Classification Search
None
See application file for complete search history.

(56) References Cited

U.S. PATENT DOCUMENTS

2009/0061299 A1* 3/2009 Uchida ............... H01M 2/1077
429/156
2009/0297943 A1 12/2009 Bielawski et al.
(Continued)

FOREIGN PATENT DOCUMENTS

KR 10-2011-0112900 A 10/2011
KR 10-2011-0130277 A 12/2011
(Continued)

OTHER PUBLICATIONS

International Search Report issued in PCT/KR2013/004979, mailed on Aug. 28, 2013.

*Primary Examiner* — Andy Rao
*Assistant Examiner* — Tyler Edwards
(74) *Attorney, Agent, or Firm* — Birch, Stewart, Kolasch & Birch, LLP

(57) ABSTRACT

Disclosed herein is a battery module including a battery cell stack configured to have a rectangular parallelepiped structure in which two or more plate-shaped battery cells, each of which has electrode terminals formed at one side thereof, are stacked and a breadth of one surface of the battery cell stack at which the electrode terminals of the battery cells are disposed is smaller than a width and a height of each major surface of the battery cell stack, a first module case bent to surround two relatively large major surfaces of the battery cell stack and one surface of the battery cell stack opposite to the surface of the battery cell stack at which the electrode terminals of the battery cells are disposed, among six surfaces of the battery cell stack and a surface, the first module case being made of a thermally conductive material that is capable of dissipating heat generated from the battery cells during charge and discharge of the battery cells, and a second module case bent to surround side surfaces of the battery cell stack adjacent to the two major surfaces of the battery cell stack and the surface of the battery cell stack at which the electrode terminals of the battery cells are disposed, the second module case being fastened to the first module case, the second module case being provided with through holes, through which the electrode terminals of the battery cells protrude outward, the second module case being made of an electrically insulative material.

24 Claims, 9 Drawing Sheets

(52) U.S. Cl.
CPC ........... *H01M2/1094* (2013.01); *H01M 2/202* (2013.01); *H01M 10/613* (2015.04); *H01M 10/647* (2015.04); *H01M 10/6554* (2015.04); *H01M 2/305* (2013.01)

(56) References Cited

U.S. PATENT DOCUMENTS

| | | | |
|---|---|---|---|
| 2010/0021802 A1* | 1/2010 | Yang | H01M 2/0212 429/91 |
| 2011/0059347 A1 | 3/2011 | Lee et al. | |
| 2012/0114999 A1 | 5/2012 | Park et al. | |
| 2013/0078487 A1* | 3/2013 | Shin | H01M 10/482 429/62 |
| 2013/0143086 A1 | 6/2013 | Lee et al. | |
| 2013/0280565 A1 | 10/2013 | Lee et al. | |

FOREIGN PATENT DOCUMENTS

| | | |
|---|---|---|
| KR | 10-2012-0016351 A | 2/2012 |
| KR | 10-2012-0048937 A | 5/2012 |
| KR | 10-2012-0048938 A | 5/2012 |
| KR | 10-2012-0051237 A | 5/2012 |

\* cited by examiner

BATTERY MODULE HAVING STRUCTURE OF IMPROVED STABILITY AND HIGH COOLING EFFICIENCY

CROSS REFERENCE TO RELATED APPLICATIONS

This application is a Continuation of PCT International Application No. PCT/KR2013/004979, filed on Jun. 5, 2013, which claims priority under 35 U.S.C. 119(a) to Patent Application No. 10-2012-0060757, filed in the Republic of Korea on Jun. 7, 2012, all of which are hereby expressly incorporated by reference into the present application.

TECHNICAL FIELD

The present invention relates to a battery module having a structure with improved stability and high cooling efficiency and, more particularly, to a battery module including a battery cell stack configured to have a rectangular parallelepiped structure in which two or more plate-shaped battery cells, each of which has electrode terminals formed at one side thereof, are stacked and a breadth of one surface of the battery cell stack at which the electrode terminals of the battery cells are disposed is smaller than a width and a height of each major surface of the battery cell stack, a first module case bent to surround two relatively large major surfaces of the battery cell stack and one surface of the battery cell stack opposite to the surface of the battery cell stack at which the electrode terminals of the battery cells are disposed, among six surfaces of the battery cell stack and a surface, the first module case being made of a thermally conductive material that is capable of dissipating heat generated from the battery cells during charge and discharge of the battery cells, and a second module case bent to surround side surfaces of the battery cell stack adjacent to the two major surfaces of the battery cell stack and the surface of the battery cell stack at which the electrode terminals of the battery cells are disposed, the second module case being fastened to the first module case, the second module case being provided with through holes, through which the electrode terminals of the battery cells protrude outward, the second module case being made of an electrically insulative material.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Meanwhile, Deutsches Institut fur Normung (DIN) of lithium secondary battery cells standardized by Verband der Automobilindustrie Deutschland (VDA) adopts prismatic battery cells having a rectangular parallelepiped shape. The number of cases in which standardized prismatic battery cells are applied to products has increased all over the world.

For pouch-shaped batteries, each of which uses an aluminum laminate sheet as a sheathing member unlike can type battery cells, however, it is difficult to retain a rigid rectangular parallelepiped shape corresponding to a standard size. For this reason, it is necessary to further provide a rigid part for surrounding the outside of each pouch-shaped battery.

FIG. 1 is a perspective view typically showing a conventional representative battery cell.

Referring to FIG. 1, a battery cell 10 is a plate-shaped battery cell 10 having electrode tabs 11 and 12 formed at one side thereof. Specifically, the plate-shaped battery cell 10 is configured to have a structure in which an electrode assembly (not shown) is mounted in a pouch-shaped case 13 made of a laminate sheet including a metal layer (not shown) and a resin layer (not shown), which is generally referred to as a pouch-shaped battery cell 10.

In addition, the pouch-shaped case 13 is configured to have a laminate structure including a resin layer and a metal foil layer. Consequently, it is possible to bond the pouch-shaped case 13 by applying heat and pressure to a sealed portion 14 so as to fuse the resin layer. According to circumstances, the pouch-shaped case 13 may be bonded using an adhesive.

However, the mechanical strength of the sheathing member 13 is low. For this reason, battery cells (unit batteries) are mounted in a pack case, such as a cartridge, so as to manufacture a battery module having a stable structure. On the other hand, a device or a vehicle, in which a middle- or large-sized battery module is installed, has a limited installation space. Consequently, in a case in which the size of the battery module is increased due to the use of the pack case, such as the cartridge, the spatial utilization is lowered. In addition, the battery cell repeatedly expands and contracts during charge and discharge of the battery cell due to low mechanical strength of the battery cell with the result that thermally bonded regions may be serrated from each other.

Therefore, there is a high necessity for a battery module that is capable of solving the problem of the pouch-shaped battery cell in that the mechanical strength of the pouch-shaped battery cell is low and achieving a standard-sized prismatic battery cell structure having a rigid rectangular parallelepiped shape.

Meanwhile, battery cells constituting such a middle or large-sized battery module may be secondary batteries which can be charged and discharged. Consequently, a larger amount of heat is generated from such high-output, large-capacity secondary batteries during charge and discharge of the secondary batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a battery pack for vehicles, which is a high-output, large-capacity battery, needs a cooling system that is capable of cooling battery cells mounted therein.

A battery module mounted in a middle or large-sized battery pack is generally manufactured by stacking a plurality of battery cells with high integration. In this case, the battery cells are stacked in a state in which the battery cells are arranged at predetermined intervals such that heat generated from the battery cells during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge and then a plurality of cartridges may be stacked to complete a battery module. Coolant channels are defined between the stacked battery cells or between the stacked battery modules so that heat accumulated between the stacked battery cells or between the stacked battery modules can be effectively removed.

In this structure, however, it is necessary to provide a plurality of coolant channels corresponding to a plurality of battery cells with the result that the overall size of the battery module is increased.

In addition, in a case in which a plurality of battery cells is stacked, coolant channels are formed such that the width of each respective coolant channel is relatively small in consideration of the size of the battery module. As a result, design of a cooling structure is complicated. That is, high pressure loss is caused in the coolant channels, each of which has a width smaller than the width of a coolant inlet port. For this reason, it is very difficult to design the shape and position of a coolant inlet port and a coolant output port. In addition, a fan may be further installed so as to prevent such pressure loss, which leads to restrictions in design due to power consumption, noise, and an installation space of the fan.

Furthermore, cooling efficiency intended in design may not be obtained due to thermal conduction resistance present between members used to constitute the cooling structure.

Therefore, there is a high necessity for a battery module which is capable of providing more improved safety and stability than a conventional rigid can type battery cell, achieving a standard-sized prismatic battery cell structure utilizing a conventional pouch-shaped battery cell, and providing excellent cooling efficiency.

DISCLOSURE

Technical Problem

Therefore, the present invention has been made to solve the above problems and other technical problems that have yet to be resolved.

It is an object of the present invention to provide a battery module configured to have a structure in which a battery cell stack, which has a rectangular parallelepiped structure in which a breadth of one surface of the battery cell stack at which electrode terminals of battery cells are disposed is smaller than a width and a height of each major surface of the battery cell stack, is received and fixed between a first module case made of a thermally conductive material that is capable of dissipating heat generated from the battery cells during charge and discharge of the battery cells and a second module case made of an electrically insulative material, by which no additional members are required, thereby improving production process efficiency based on a simple assembly procedure and it is possible to rapidly provide a standard-sized prismatic battery module structure according to demand of customers.

It is another object of the present invention to provide a prismatic battery module, including a first module case and a second module case, configured to have a structure in which the first module case is made of a thermally conductive material that is capable of dissipating heat generated from battery cells such that a cooling structure can be more easily designed than in a conventional battery module and the prismatic battery module structure is configured utilizing a battery cell stack exhibiting flexible material properties of a pouch, thereby providing more improved safety and stability than a conventional rigid can type battery cell.

Technical Solution

In accordance with one aspect of the present invention, the above and other objects can be accomplished by the provision of a battery module including a battery cell stack configured to have a rectangular parallelepiped structure in which two or more plate-shaped battery cells, each of which has electrode terminals formed at one side thereof, are stacked and a breadth of one surface of the battery cell stack at which the electrode terminals of the battery cells are disposed is smaller than a width and a height of each major surface of the battery cell stack, a first module case bent to surround two relatively large major surfaces of the battery cell stack and one surface of the battery cell stack opposite to the surface of the battery cell stack at which the electrode terminals of the battery cells are disposed, among six surfaces of the battery cell stack and a surface, the first module case being made of a thermally conductive material that is capable of dissipating heat generated from the battery cells during charge and discharge of the battery cells, and a second module case bent to surround side surfaces of the battery cell stack adjacent to the two major surfaces of the battery cell stack and the surface of the battery cell stack at which the electrode terminals of the battery cells are disposed, the second module case being fastened to the first module case, the second module case being provided with through holes, through which the electrode terminals of the battery cells protrude outward, the second module case being made of an electrically insulative material.

For example, each of the plate-shaped battery cells may be a pouch-shaped battery cell configured to have a structure in which an electrode assembly having a structure comprising a cathode, an anode, and a separator disposed between the cathode and the anode is mounted in a battery case made of a laminate sheet comprising a resin layer and a metal layer and an outer circumference of a receiving part of the battery case is sealed by thermal bonding.

In addition, each of the plate-shaped battery cells may be a lithium secondary battery having a small thickness and a relatively large width and length so as to minimize the overall size of a battery module when the battery cells are stacked to constitute the battery module.

As previously described, it is difficult for a pouch-shaped battery using an aluminum laminate sheet as a sheathing member unlike a can type battery cell to retain a rigid rectangular parallelepiped shape corresponding to a standard size. For this reason, it is necessary to further provide a rigid part for surrounding the outside of the pouch-shaped battery.

The battery module according to the present invention includes a first module case and a second module case configured to surround the outside of the pouch-shaped battery. Consequently, it is possible to provide a standard-sized prismatic battery module structure through a simple assembly procedure.

In addition, the pouch-shaped battery cell has safer structural advantages than the rigid can type battery cell. Specifically, the pouch-shaped battery cell has advantages in that the pouch-shaped battery cell exhibits safer behavior in terms of safety-related issues, such as swelling, gas vent, fire, and explosion, of the lithium secondary battery caused by overcharge or overdischarge of the lithium secondary battery or exposure of the lithium secondary battery to high temperature by virtue of flexible material properties of a pouch.

Consequently, the battery module having the standardized prismatic battery cell shape according to the present invention constituted by the pouch-shaped battery cell having the above advantages has much more advantages than the can type prismatic battery cell.

In addition, the battery module according to the present invention includes a first module case made of a thermally conductive material that is capable of dissipating heat generated from the battery cells during charge and discharge of the battery cells, thereby providing a standardized prismatic battery cell structure and, at the same time, achieving a cooling effect of the battery cells. In a case in which a battery system including the battery module according to the present invention is configured, therefore, it is possible to design a cooling structure exhibiting more improved cooling efficiency characteristics.

Furthermore, the battery module according to the present invention is configured to have a structure in which the battery module is easily assembled by easy coupling between the first module case and the second module case. In the process of manufacturing the standard-sized prismatic battery cell, therefore, it is possible to improve production process efficiency based on a simple assembly procedure.

In a preferred example, the battery cells may be connected in parallel to each other. In the battery module including the above structure according to the present invention, therefore, it is possible to properly change the number of battery cells to be connected in parallel to each other, whereby it is possible to design and manufacture a battery module corresponding to a desired electric capacity.

According to circumstances, on the other hand, a soft elastic pad may be further disposed at an interface between the respective battery cells of the battery cell stack.

The pad is not particularly restricted so long as the pad is made of a soft elastic material that is capable of absorbing the change in thickness of the respective battery cells of the battery cell stack to retain a standard size of each of the battery cells. Preferably, the pad is made of a polyurethane material or a silicone material.

The pad made of the soft elastic material may absorb the change in thickness of the pouch-shaped battery cell due to swelling of the pouch-shaped battery cell. Even when the thickness of the battery cell is changed, therefore, it is possible to retain the standard size of the battery cell. Consequently, it is possible to achieve a more stable and rigid battery module structure.

In a preferred example, the material for the first module case is not particularly restricted so long as the first module case is made of a material exhibiting high thermal conductivity that is capable of absorbing heat generated from the battery cells and dissipating the absorbed heat to the outside. Preferably, the first module case is made of a thermally conductive metal sheet.

In a concrete example, the first module case may be formed by cutting and bending the thermally conductive metal sheet into a size corresponding to a planar size of the battery cell stack and press molding the metal sheet such that the metal sheet has a bracket shape in vertical section.

The first module case made of the metal material is disposed in direct contact with the side parts of the plate-shaped battery cells and, therefore, it is possible to rapidly and efficiently conduct heat generated from the battery cells. Consequently, it is possible to cool the battery cell stack with higher efficiency than in the conventional system without the provision of a space between the battery cells included in at least one unit module, thereby maximizing heat dissipation efficiency of the battery module and stack the battery cells with high integration.

According to circumstances, a heat conduction medium may be disposed at an interface between the battery cell stack and the first module case. In this case, the heat conduction medium is not particularly restricted so long as the heat conduction medium is made of a thermally conductive material exhibiting high thermal conductivity. Preferably, the heat conduction medium is at least one selected from a group consisting of a thermally conductive grease, a thermally conductive epoxy-based bond, a thermally conductive silicone pad, a thermally conductive adhesive tape, and a graphite sheet.

Meanwhile, the mechanical strength of the sheathing member of each of the battery cells is low. For this reason, the second module case may be made of an electrically insulative material exhibiting high mechanical strength so as to manufacture a battery module having a stable structure. Preferably, the second module case is made of a plastic material. As a result, the second module case protects the battery cells mounted in the module case from external mechanical impact and, at the same time, enables the battery cells to be stably mounted in the battery module.

Consequently, the second module case made of the electrically insulative material exhibiting high mechanical strength may easily protect the electrode terminals of the battery cell stack mounted in the module case from an electric short circuit or external mechanical damage.

Preferably, external input and output terminals, to which the electrode terminals of the battery cell stack are electrically connected, is formed at a surface of the second module case at which the electrode terminals of the battery cell stack are disposed.

Specifically, the external input and output terminals may be formed at the sides, the upper part, or the lower part of the second module case. The position of the second module case at which the external input and output terminals are formed is changed depending upon the surface of the second module case at which the electrode terminals of the battery cell stack received in the second module case are disposed.

In addition, the external input and output terminals may be two terminal bolts. Specifically, the terminal bolts may be mounted at the second module case using one selected from a group consisting of insert injection molding, sandwich molding, soluble core injection molding, gas-assisted injection molding, injection compression molding, structural foam injection molding, microlayer injection molding, live-feed injection molding, push-pull injection molding, and injection molding of reactive materials.

Since the terminal bolts can be mounted at the second module case using the above-mentioned methods as described above, it is not necessary to provide an additional member for coupling between the metal material and the insulative material. As a result, it is not necessary to provide an additional space in which such an additional member will be mounted and an additional process for mounting such an additional member. Consequently, it is possible to achieve an efficient assembly process of the battery module.

Preferably, bus bars for electrically connecting the electrode terminals of the battery cells to the terminal bolts are further mounted at the second module case. The bus bars may be 'I'-shaped bus bars.

Specifically, each of the bus bars may include a head having a through hole, through which a corresponding one of the terminal bolts is inserted, respectively, and a plate-shaped body extending from the head.

In addition, the bus bars may be fastened to the respective terminal bolts in a case in which the bus bars are located at the surface of the second module case at which the electrode terminals of the battery cell stack are disposed such that the bus bars are electrically coupled to the electrode terminals.

Specifically, the coupling between the bus bars and the electrode terminals may be achieved by perpendicularly bending the electrode terminals, which protrude upward, such that the electrode terminals contact the plate-shaped bodies of the bus bars and electrically coupling the electrode terminals and the bus bars in a contact state by laser welding or spot welding.

Consequently, it is possible to easily electrically connect the external input and output terminals to the electrode terminals of the battery cells received in the module case using the above-mentioned method.

In addition, the bus bars configured to have the above structure is mounted at the upper part of the second module case and, at the same time, is coupled to the electrode terminals by welding. Consequently, it is possible to provide a battery module having a more rigid and stable structure. Furthermore, welding between the electrode terminals and the bus bars is easily achieved and it is not necessary to provide an additional space in which such an additional member will be mounted and an additional process for mounting such an additional member. Consequently, it is possible to achieve an efficient assembly process of the battery module.

In a preferred example, the first module case and the second module case may be fastened to each other by interference fit.

The interference fit may be achieved by step parts formed at three edges of each of the major surfaces of the first module case contacting the second module case among four edges of each of the major surfaces of the first module case and protrusions formed at insides of three edges of the second module case contacting the first module case.

The above assembly fastening method does not need an additional connection member for fastening. For this reason, it is not necessary to provide an additional space in which the connection member will be mounted and an additional process for mounting the connection member. Consequently, it is possible to manufacture a battery module having a compact structure and to achieve an efficient assembly process of the battery module.

In accordance with other aspects of the present invention, there are provided a battery pack including one or more battery modules with the above-stated construction mounted in a pack case and a device including the battery pack with the above-stated construction as a power source. Specifically, the device may be an electric vehicle, a hybrid electric vehicle, a plug-in hybrid electric vehicle, or a power storage device.

The structure and manufacturing method of the device are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
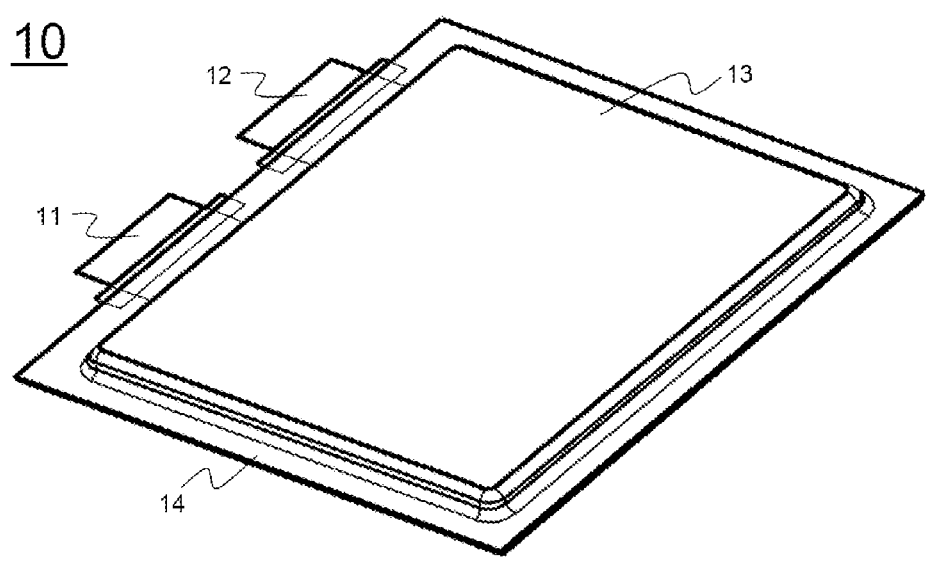
FIG. 1 is a perspective view showing a battery cell according to the present invention.
Figure 2:
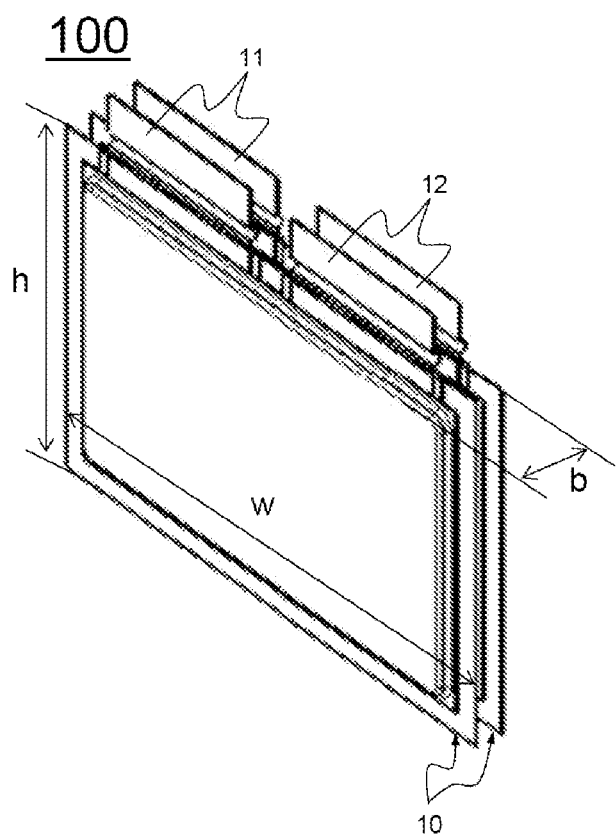
FIG. 2 is a perspective view showing a battery cell stack according to the present invention.
Figure 3:
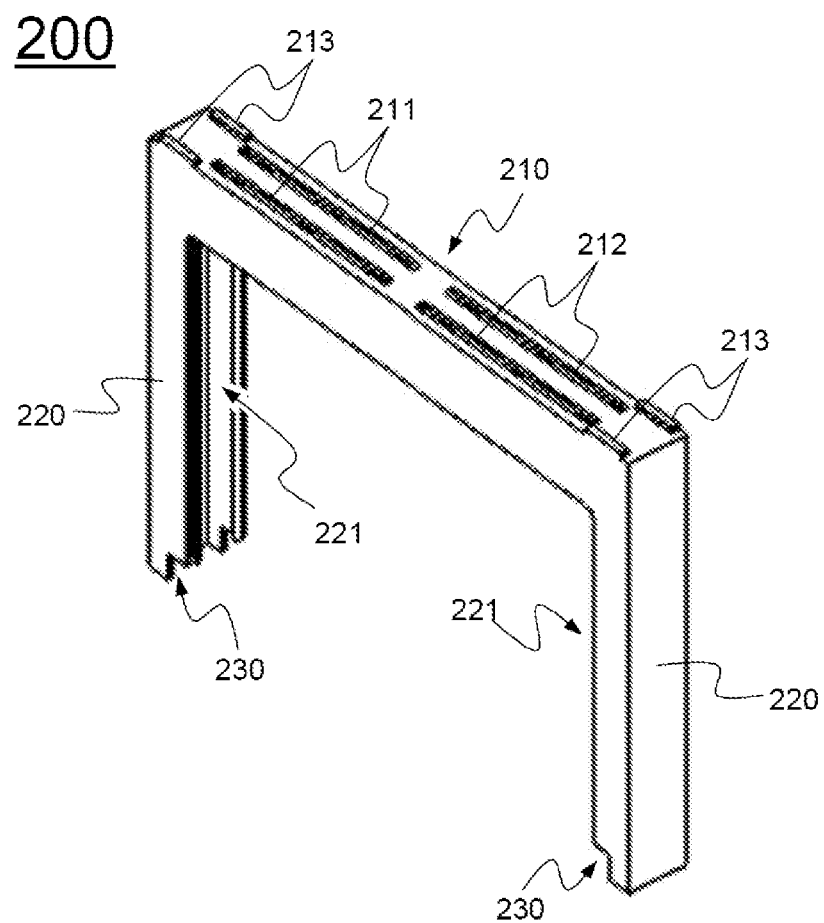
FIG. 3 is a perspective view showing a second module case according to the present invention.
Figure 4:
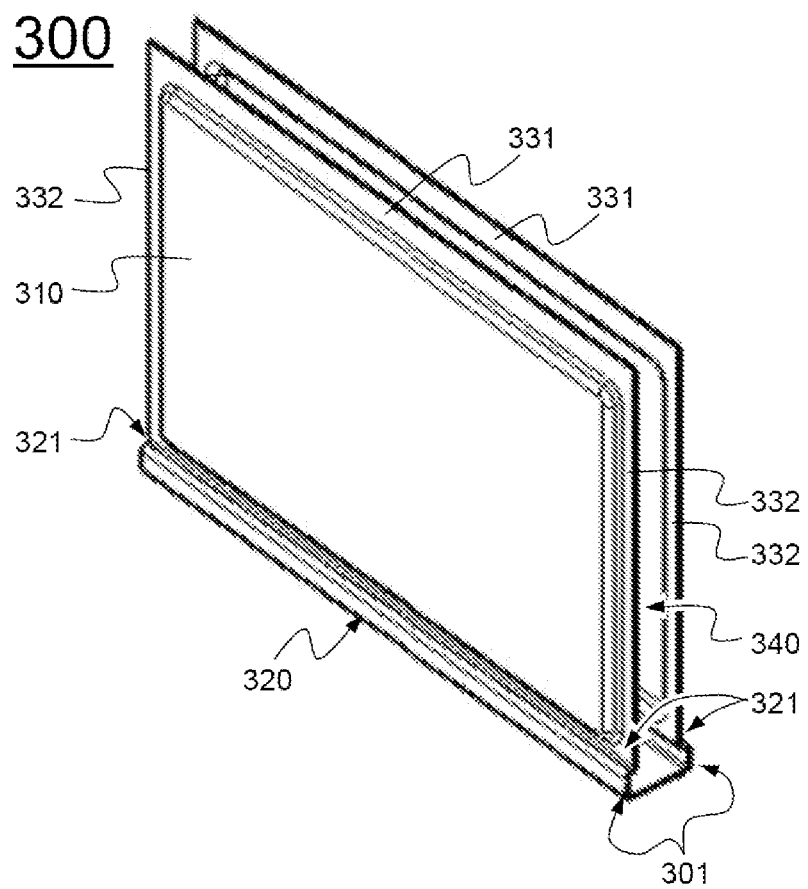
FIG. 4 is a perspective view showing a first module case according to the present invention.

FIGS. 1 and 2 are perspective views showing a battery cell and a battery cell stack according to the present invention, respectively. In addition, FIGS. 3 and 4 are perspective views showing a second module case and a first module case according to the present invention, respectively.

Referring to these drawings, a battery cell stack 100 is configured to have a structure in which battery cells 10 are stacked such that relatively large major surfaces 13 of the battery cells, among six surfaces of the battery cells 10, are in contact with each other. The battery cell stack 100 has a rectangular parallelepiped structure in which a breadth b of one surface of the battery cell stack 100 at which electrode terminals 11 and 12 are disposed is smaller than a width w and a height h of each major surface of the battery cell stack 100.

Meanwhile, a second module case 200 is a structure including an upper part 210 and side parts 220.

Specifically, the upper part 210 of the second module case 200 is provided with slit-shaped through holes 211 and 212, through which the electrode terminals 11 and 12 of the battery cell stack 100 are exposed. In addition, the upper part 210 of the second module case 200 is provided at opposite ends thereof outside the through holes 211 and 212 with mounting protrusions 213 formed for easily coupling and mounting of a device (not shown) in which a battery module including the battery cell stack 100 will be mounted or another battery module (not shown).

In addition, the side parts 220 of the second module case 200 are provided at the inner surfaces thereof with receiving parts 221 for receiving and fixing sealed portions 14 of the battery cell stack 100. "¬"-shaped depressions 230 are formed at the lower ends of the respective side parts 220 of the second module case 200. The depressions 230 are formed for easy assembly with a first module case 300, which will hereinafter be described in detail.

On the other hand, the first module case 300 is formed by cutting and bending (see reference numeral 301) a thermally conductive metal sheet into a size corresponding to the major surface 13 of the battery cell stack 100 and press molding the metal sheet such that the metal sheet has a bracket shape in vertical section.

Specifically, the first module case 300 is a structure including a heat dissipation part 310, a lower end fixing part 320, side assembly parts 331 and 332, and a battery cell receiving part 340.

Figure 5:
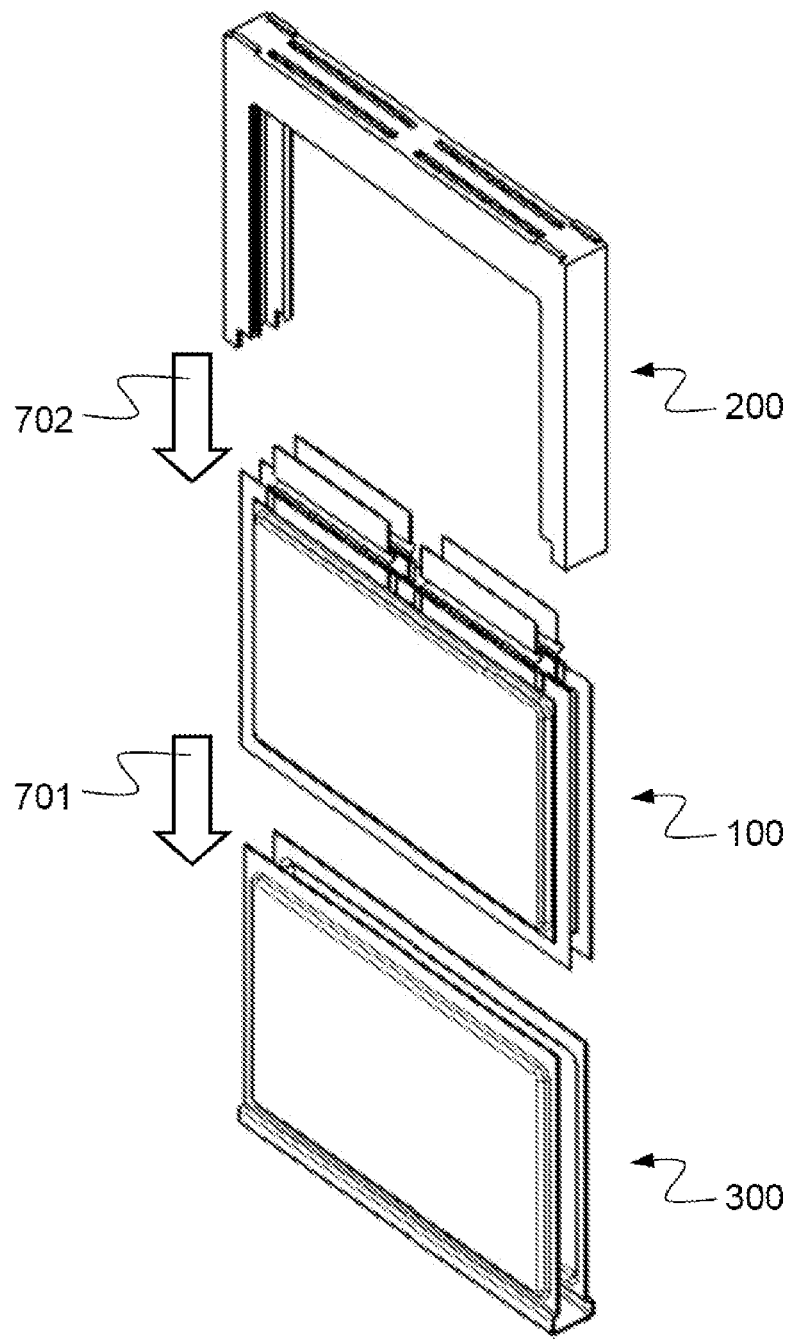
FIG. 5 is an exploded view showing a battery module according to the present invention.

FIG. 5 is an exploded view showing a battery module according to the present invention.

Referring to FIG. 5 together with FIGS. 1 to 4, the battery cell stack 100 is received (see reference numeral 701) in the battery cell receiving part 340 of the first module case 300 and then the second module case 200 is coupled (see reference numeral 702) to the first module case 300 to complete the battery module.

Figure 6:
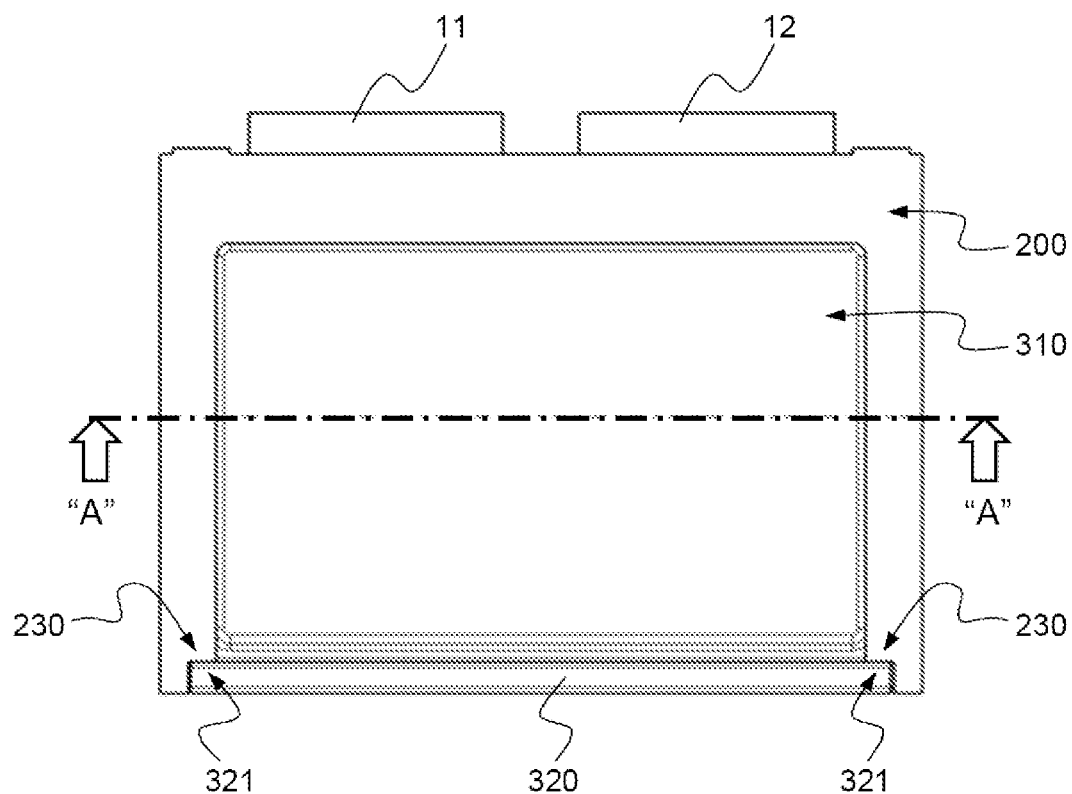
FIG. 6 is a front view showing the battery module according to the present invention.

FIG. 6 is a front view showing the battery module according to the present invention.

Referring to FIG. 6 together with FIG. 5, the battery module according to the present invention is completed by receiving the battery cell stack 100 in the first module case 300 and assembling (see reference numerals 701 and 702) the first module case 300 and the second module case 200. The assembly (see reference numerals 701 and 702) between the first module case 300 and the second module case 200 is easily achieved by engagement of protrusions 321 extending from opposite ends of the lower end fixing part 320 into the "¬"-shaped depressions 230 are formed at the lower end of the second module case 200.

Figure 7:
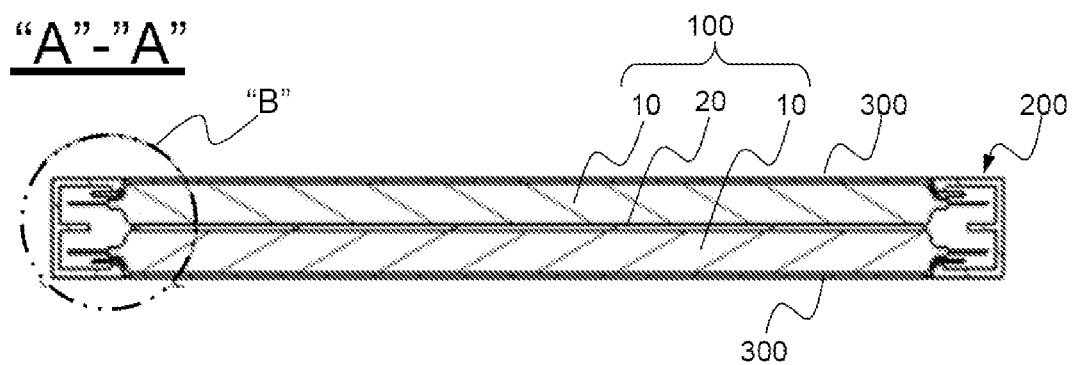
FIG. 7 is a sectional view taken along line "A"-"A" of FIG. 6.
Figure 8:
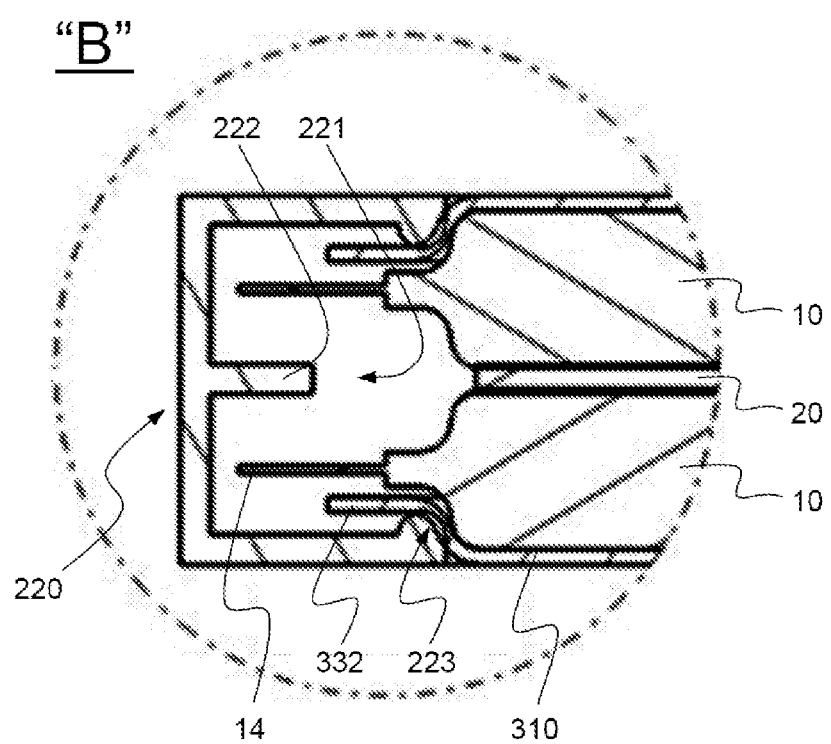
FIG. 8 is an enlarged view showing part "B" of FIG. 7.

FIG. 7 is a sectional view taken along line "A"-"A" of FIG. 6 and FIG. 8 is an enlarged view showing part "B" of FIG. 7.

Referring to these drawings, the first module case 300 and the second module case 200 are assembled by interference fit between the side assembly parts 332 of the first module case 300 and fixing protrusions 223 formed at the receiving parts 221 of the side parts 220 of the second module case 200.

In addition, a soft elastic pad 20 is mounted at an interface between the battery cells 10.

Figure 9:
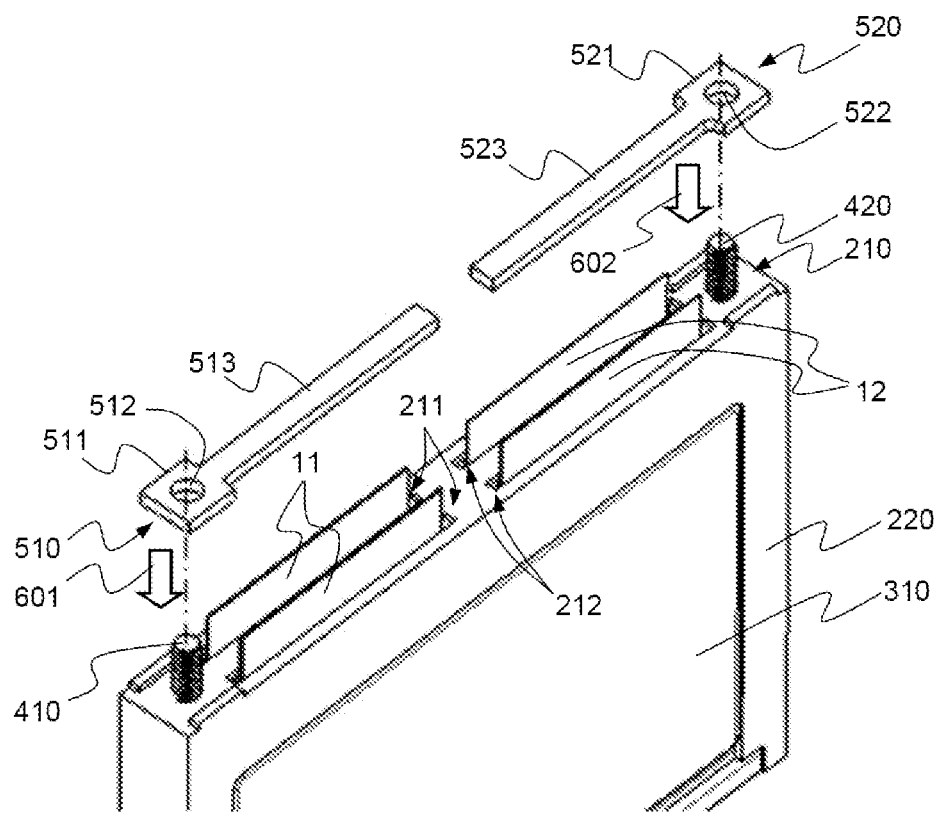
FIGS. 9 and 10 are perspective views showing a process of mounting bus bars in the battery module according to the present invention and a state in which the bus bars are mounted in the battery module according to the present invention, respectively.

FIG. 9 is a perspective view showing a process of mounting bus bars in the battery module according to the present invention.

Referring to FIG. 9 together with FIGS. 2 to 4, terminal bolts 410 and 420 are formed at the upper part 210 of the second module case 200 by insert injection molding. In addition, the electrode terminals 11 and 12 of the battery cell stack 100 received between the first module case 300 and the second module case 200 are exposed upward through the slit-shaped through holes 211 and 212 formed at the upper part 210 of the second module case 200. In addition, bus bars 510 and 520 are configured to have an T-shaped structure in which the bus bars 510 and 520 are mounted at the upper part 210 of the second module case 200 by the terminal bolts 410 and 420. Specifically, the bus bars 510 and 520 include heads 511 and 521 having through holes 512 and 522, through which the terminal bolts 410 and 420 are inserted, respectively, and plate-shaped bodies 513 and 523 extending from the respective heads 511 and 521.

Figure 10:
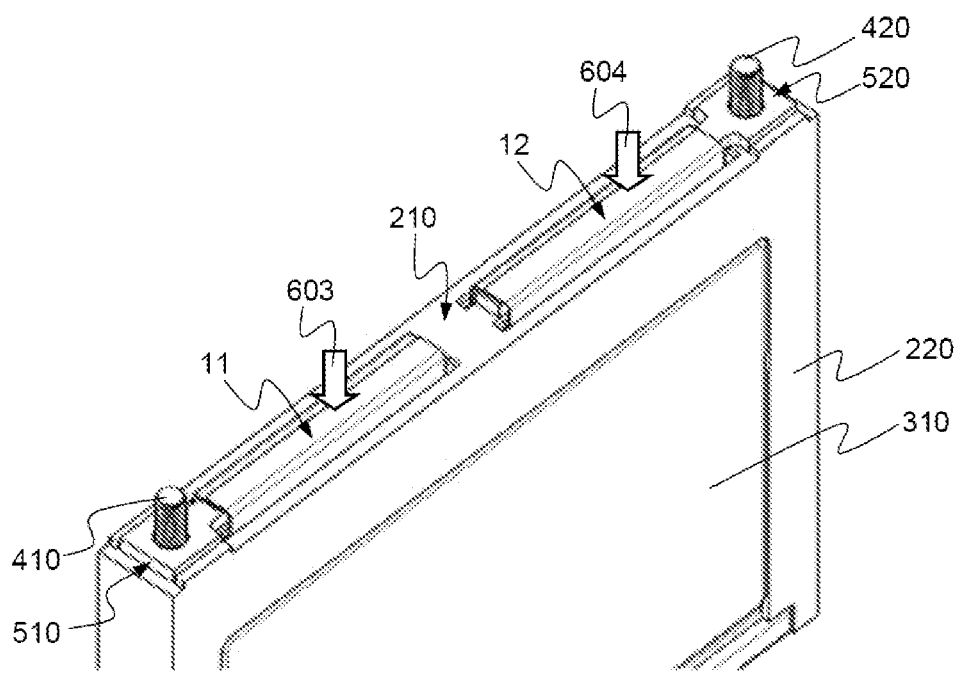

FIG. 10 is a perspective view showing a state in which the bus bars are mounted in the battery module according to the present invention.

Referring to FIG. 10 together with FIG. 9, the bus bars 510 and 520 are coupled to the electrode terminals 11 and 12, respectively, as follows. The electrode terminals 11 and 12, which protrude upward, are bent perpendicularly such that the electrode terminals 11 and 12 contact the plate-shaped bodies 513 and 523 of the bus bars 510 and 520 and then the electrode terminals 11 and 12 and the bus bars 510 and 520 in a contact state are electrically coupled to each other by laser welding.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured such that a cooling structure can be more easily designed than in a conventional battery module and a prismatic battery module structure is configured utilizing a battery cell stack exhibiting flexible material properties of a pouch, thereby providing more improved safety and stability than a conventional rigid can type battery cell. In addition, no additional members are required, thereby improving production process efficiency based on a simple assembly procedure. Furthermore, it is possible to rapidly provide a standard-sized prismatic battery module structure according to demand of customers.

The invention claimed is:
1. A battery module comprising:
a battery cell stack configured to have a rectangular parallelepiped structure in which two or more plate-shaped battery cells, each of which has electrode terminals formed at one side thereof, are stacked and a breadth of one surface of the battery cell stack at which the electrode terminals of the battery cells are disposed is smaller than a width and a height of each major surface of the battery cell stack;
a first module case bent to surround two relatively large major surfaces of the battery cell stack and one surface of the battery cell stack opposite to the surface of the battery cell stack at which the electrode terminals of the battery cells are disposed, among six surfaces of the battery cell stack and a surface, the first module case being made of a thermally conductive material that is capable of dissipating heat generated from the battery cells during charge and discharge of the battery cells; and
a second module case bent to surround side surfaces of the battery cell stack adjacent to the two major surfaces of the battery cell stack and the surface of the battery cell stack at which the electrode terminals of the battery cells are disposed, the second module case being fastened to the first module case, the second module case being provided with through holes, through which the electrode terminals of the battery cells protrude outward, the second module case being made of an electrically insulative material.

2. The battery module according to claim 1, wherein each of the plate-shaped battery cells is a pouch-shaped battery cell configured to have a structure in which an electrode assembly having a structure comprising a cathode, an anode, and a separator disposed between the cathode and the anode is mounted in a battery case made of a laminate sheet comprising a resin layer and a metal layer and an outer circumference of a receiving part of the battery case is sealed by thermal bonding.

3. The battery module according to claim 1, wherein each of the plate-shaped battery cells is a lithium secondary battery.

4. The battery module according to claim 1, wherein the battery cells are connected in parallel to each other.

5. The battery module according to claim 1, wherein a soft elastic pad is further disposed at an interface between the respective battery cells of the battery cell stack.

6. The battery module according to claim 5, wherein the pad is made of a polyurethane material or a silicone material.

7. The battery module according to claim 1, wherein the first module case is made of a thermally conductive metal sheet.

8. The battery module according to claim 7, wherein the first module case is formed by cutting and bending the thermally conductive metal sheet into a size corresponding to a planar size of the battery cell stack and press molding the metal sheet such that the metal sheet has a bracket shape in vertical section.

9. The battery module according to claim 1, wherein the second module case is made of a plastic material.

10. The battery module according to claim 1, wherein external input and output terminals, to which the electrode terminals of the battery cell stack are electrically connected, are formed at a surface of the second module case at which the electrode terminals of the battery cell stack are disposed.

11. The battery module according to claim 10, wherein the external input and output terminals are two terminal bolts.

12. The battery module according to claim 11, wherein the terminal bolts are mounted at the second module case using one selected from a group consisting of insert injection molding, sandwich molding, soluble core injection molding, gas-assisted injection molding, injection compression molding, structural foam injection molding, microlayer injection molding, live-feed injection molding, push-pull injection molding, and injection molding of reactive materials.

13. The battery module according to claim 11, wherein bus bars for electrically connecting the electrode terminals of the battery cells to the terminal bolts are further mounted at the second module case.

14. The battery module according to claim 13, wherein the bus bars are 'I'-shaped bus bars.

15. The battery module according to claim 14, wherein each of the bus bars comprises a head having a through hole, through which a corresponding one of the terminal bolts is inserted, respectively, and a plate-shaped body extending from the head.

16. The battery module according to claim 15, wherein the bus bars are fastened to the respective terminal bolts in a case in which the bus bars are located at the surface of the second module case at which the electrode terminals of the battery cell stack are disposed such that the bus bars are electrically coupled to the electrode terminals.

17. The battery module according to claim 16, wherein the coupling between the bus bars and the electrode terminals is achieved by perpendicularly bending the electrode terminals, which protrude upward, such that the electrode terminals contact the plate-shaped bodies of the bus bars and electrically coupling the electrode terminals and the bus bars in a contact state by laser welding or spot welding.

18. The battery module according to claim 1, wherein the first module case and the second module case are fastened to each other by interference fit.

19. The battery module according to claim 18, further comprising:
    step parts formed at three edges of each of the major surfaces of the first module case contacting the second module case among four edges of each of the major surfaces of the first module case; and
    protrusions formed at insides of three edges of the second module case contacting the first module case.

20. The battery module according to claim 1, wherein a heat conduction medium is disposed at an interface between the battery cell stack and the first module case.

21. The battery module according to claim 20, wherein the heat conduction medium is at least one selected from a group consisting of a thermally conductive grease, a thermally conductive epoxy-based bond, a thermally conductive silicone pad, a thermally conductive adhesive tape, and a graphite sheet.

22. A battery pack comprising one or more battery modules according to claim 1 mounted in a pack case.

23. A device comprising a battery pack according to claim 22 as a power source.

24. The device according to claim 23, wherein the device is an electric vehicle, a hybrid electric vehicle, a plug-in hybrid electric vehicle, or a power storage device.

* * * * *